(12) United States Patent
Rasch et al.

(10) Patent No.: US 12,719,397 B2
(45) Date of Patent: Aug. 25, 2026

(54) POWER SUPPLY SYSTEM FOR A POWER ELECTRONIC CIRCUIT

(71) Applicant: ZF Friedrichshafen AG, Friedrichshafen (DE)

(72) Inventors: Marc Rasch, Immenstaad (DE); Sebastian Besold, Neudrossenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/607,760

(22) Filed: Mar. 18, 2024

(65) Prior Publication Data

US 2024/0322730 A1 Sep. 26, 2024

(30) Foreign Application Priority Data

Mar. 21, 2023 (DE) ..................... 10 2023 202 463.2

(51) Int. Cl.
*H02P 27/06* (2006.01)
*H02J 7/00* (2026.01)

(52) U.S. Cl.
CPC .............. *H02P 27/06* (2013.01); *H02J 7/855* (2026.01)

(58) Field of Classification Search
CPC ............................... H02P 27/06; H02J 7/0063
USPC ........................................................ 307/10.1
See application file for complete search history.

(56) References Cited

U.S. PATENT DOCUMENTS

2015/0042259 A1* 2/2015 Kim ........................ E02F 9/226 318/703
2020/0195190 A1* 6/2020 Horiuchi ............... H02P 29/032
2020/0328660 A1* 10/2020 Guo ...................... B60L 3/0084
2023/0029680 A1 2/2023 Schulz et al.

OTHER PUBLICATIONS

Office Action in Corresponding German Application No. DE 10 2023 202 463.2, dated Feb. 12, 2024 (9 pages).

* cited by examiner

*Primary Examiner* — Michael R. Fin
(74) *Attorney, Agent, or Firm* — Crowell & Moring LLP

(57) ABSTRACT

A power supply system for a power electronic circuit of an electric vehicle includes a driver board with components configured to activate the power electronic circuit, a monitoring device configured to monitor the supply voltage, and a circuit assembly having a switching element arranged between an accumulator or a phase of the electric motor and the driver board so that the switching element provides a power supply from the accumulator or electric motor for components of the driver board. When the monitoring device detects a failure or reduction in the supply voltage of a component of the driver board, the monitoring device transfers the switching element from an open state to a closed state, for which the supply voltage has failed or collapsed.

10 Claims, 2 Drawing Sheets

POWER SUPPLY SYSTEM FOR A POWER ELECTRONIC CIRCUIT

CROSS-REFERENCE TO RELATED APPLICATION

This application claims priority to German Application No. DE 10 2023 202 463.2, filed on Mar. 21, 2023, the entirety of which is hereby fully incorporated by reference herein.

FIELD

The present disclosure relates to the field of electromobility, in particular to power electronic modules for an electric drive.

BACKGROUND

The use of electronic modules, such as power electronic modules, in motor vehicles has increased sharply in recent decades. On the one hand, this is due to the need to improve fuel economy and vehicle performance and, on the other hand, to advances in semiconductor technology. Power electronics makes use of semiconductor chips. These are parallelized to form a topological switch when the current carrying capacity needs to be increased. Semiconductor chips which are connected in parallel and usually consist of silicon or silicon carbide, can be installed in individual, already packaged components, so-called discrete components, or together in a circuit carrier, the so-called power electronics module or power module. In the power modules, a high packing density must be ensured so that unwanted effects such as oscillations or overvoltages can be avoided. Thus, even high potential differences can occur spatially very close to one another, which has advantages for the electrical behavior. In addition, the parallelized chips are also packaged locally close to each other, e.g. to reduce differences in the dynamic current distribution.

In the event of a malfunction or failure or a breakdown of a supply voltage of a component, the entire power electronic circuit may fail.

SUMMARY

Therefore, an object of the present disclosure is to provide a power supply for the case when a failure or a collapse in a supply voltage occurs on one of the components of the driver board of the power electronic circuit.

This object is achieved by the features of the present disclosure. Advantageous embodiments are also the subject matter of the present disclosure.

It is proposed to provide a power supply system for a power electronic circuit of an at least partially electrically driven motor vehicle, comprising an accumulator and an electric motor having at least one phase, wherein a driver board with components arranged thereon is provided, which are configured to activate the power electronic circuit, wherein specified components of the driver board are supplied with a supply voltage, and wherein at least one monitoring device is also provided, which is configured to monitor the supply voltage, and a circuit assembly having a switching element which is arranged between the accumulator or at least one phase of the electric motor and the driver board, in such a way that said switching element can provide a power supply from the accumulator or electric motor for one or more components of the driver board, wherein in the event that the monitoring device detects a failure or a reduction in the supply voltage of one or more components of the driver board, the monitoring device transfers the switching element from an open state, in which it supplies no power from the accumulator or electric motor for one or more components of the driver board, to a closed state, in which it supplies power from the accumulator or electric motor for one or more components of the driver board, for which the supply voltage has failed or collapsed.

In one embodiment, it is provided that the monitoring device, in the event that it detects a failure or a reduction in the supply voltage, outputs an emergency signal to the switching element, which is configured to immediately change its state.

In one embodiment, it is provided that the power electronic circuit has a topological switch having at least two power semiconductors connected in parallel with one another, and at least one driver supplied with a supply voltage, which is configured to activate the power semiconductors.

In one embodiment, it is provided that if the electric motor is used as the power source for the driver, a voltage divider and at least one diode and the switching element are arranged between the electric motor and the driver.

In one embodiment it is provided that, if the accumulator is used as the power source for the driver, a voltage divider and the switching element are arranged between the accumulator and driver.

One design provides that the power supply system is part of an electronics module of the motor vehicle. Furthermore, a motor vehicle is provided, comprising the power supply system.

Furthermore, the present disclosure relates to a method for providing a power supply for a power electronic circuit of an at least partially electrically driven motor vehicle, comprising an accumulator and an electric motor having at least one phase, wherein a driver board with components arranged thereon is provided, which are configured to activate the power electronic circuit, wherein specified components of the driver board are supplied with a supply voltage, wherein in the event that a failure or a reduction in the supply voltage of one or more components of the driver board is detected, power is supplied from the accumulator or electric motor for the one or more components of the driver board in which the supply voltage has failed or has collapsed.

Further features and advantages of the present disclosure are derived from the following description of exemplary embodiments of the invention, on the basis of the figures in the drawing, which show details according to the present disclosure, and from the claims. The individual features may be realized individually or together in any combination in a variant of the present disclosure.

Hereafter, preferred embodiments of the present disclosure are described in greater detail on the basis of the enclosed drawings.

DETAILED DESCRIPTION

In the following descriptions of the figures equivalent elements or functions are labelled with the same reference signs.

The present disclosure relates to a power supply system for a power electronic circuit, such as an inverter for use in the automotive sector, in particular for applications in at least partially electrically driven vehicles.

With this subject matter of the present disclosure, an accumulator of the vehicle or the power source of the electric motor EM (also referred to as E-machine) is switched as a backup for the driver supply, i.e. used as a replacement for a failed or collapsed supply voltage of components of the driver board, which must be supplied with a supply voltage. This creates a redundant power supply (current and/or voltage).

Figure 1:
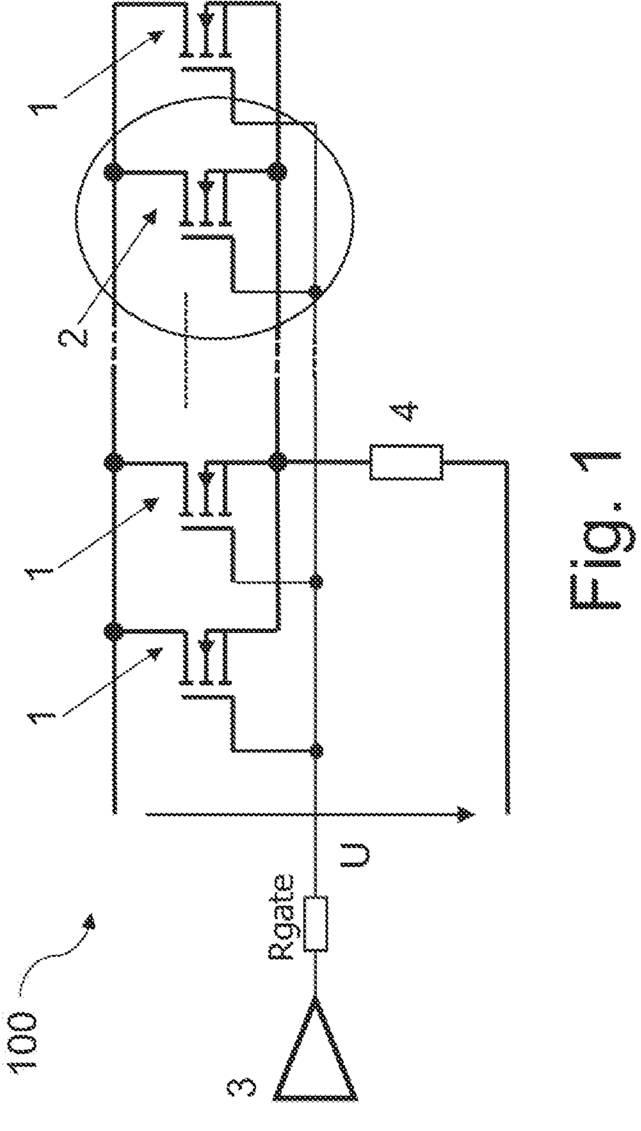
FIG. 1 shows a schematic structure of a power electronic circuit having a defective power semiconductor according to the prior art.

In all embodiments, the power electronic circuit has at least one topological switch 100, which is formed of at least two power semiconductors 1, 2 connected in parallel with one another. These are advantageously formed as a MOSFET (as shown in the figures) or an IGBT, wherein other transistors suitable for the intended application can also be used. In addition, the power electronic circuit has a driver board with various components, such as a driver 3, which is configured to activate the power semiconductors 1, 2, as well as an associated gate resistor R_gate connected in series, as shown in FIG. 1. A load 4 is also shown, in order to supply the power semiconductors 1, 2 with current. The HV voltage U1 is also indicated. This structure is a standard circuit design according to the prior art and shown in FIG. 1. The components of the driver board can be both passive and ones that require a supply voltage (HV or LV), such as the driver 3.

For example, in the event of a defective power semiconductor 2 of the power electronic circuit, it can occur that the power supply of the driver 3 collapses (fails) or its power source (providing the supply voltage) is no longer sufficient to provide the supply (collapses), in order to establish the safe state, that is, to switch all power semiconductors 1, 2 of a topological switch to conducting. The present disclosure serves to prevent such a case as far as possible, by providing a redundant power source in order to continue to supply components of the power electronic circuit with power even in the event of a fault (failure/collapse in the supply voltage).

A prerequisite for this is detecting that the supply voltage of one of the components of the driver board of the power electronic circuit has failed or has collapsed. For this purpose, voltage monitoring is provided in the form of a monitoring device 10, which also serves to output an emergency signal EC if a failure or collapse in the supply voltage is detected. In response to this emergency signal EC, the electric motor EM or the accumulator is then used as a replacement power source.

The voltage monitoring can be carried out with a suitable component, e.g. a Schmitt trigger. A delay element (e.g. RC element) can also be provided, which allows the emergency signal EC to be output only after a specified time. This is used to identify only an actual fault as a fault and not to trigger any unnecessary response.

Figure 2:
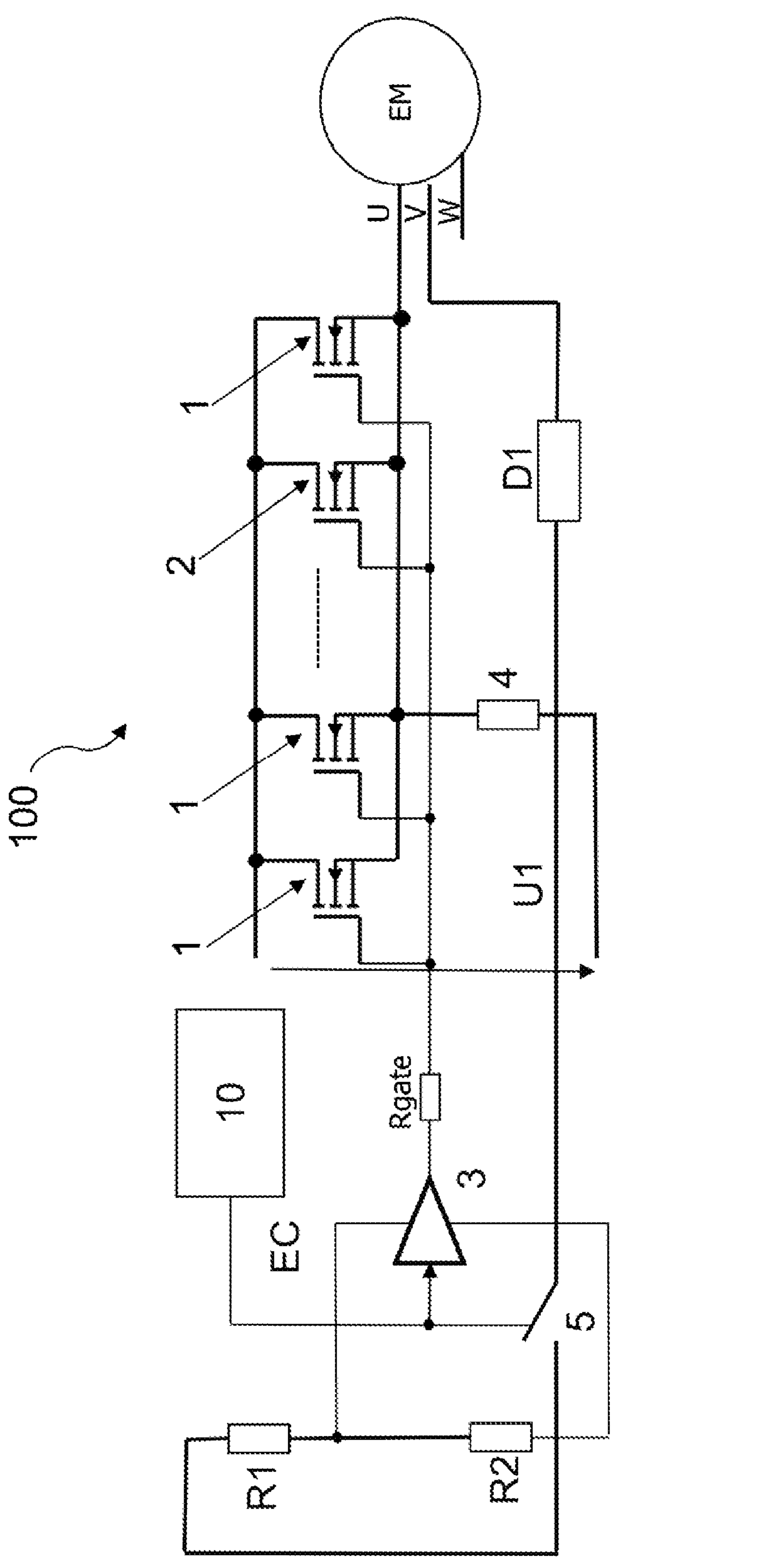
FIG. 2 shows a schematic structure of a power supply system for a power electronic circuit according to an embodiment of the present disclosure.

If the monitoring device 10 detects a failure or collapse in the supply voltage, an emergency signal EC is output and the electric motor EM (preferably) or the accumulator (high-voltage accumulator) of the at least partially electrically driven motor vehicle is attached to the driver board as an additional power source. FIG. 2 shows an example in which the electric motor EM is attached as a power source to the driver 3 of the driver board to supply it with power. In this case, a voltage divider R1, R2 is also advantageously provided, which is connected to the driver 3. Also, when power is supplied via the accumulator, a voltage divider R1, R2 is advantageously provided, which is used to supply a lower voltage than the high voltage to the driver 3.

In order to provide the driver board with the redundant power supply (EM or accumulator), a circuit assembly having a switching element 5 is provided, which, in the event that the supply voltage of a component of the driver board (in the embodiment shown, the driver 3) fails or collapses and an emergency signal EC is output, electrically connects the accumulator or the electric motor EM to the component, in this case the driver 3, and supplies the latter with power. In the normal state, that is, when no power is being supplied via the accumulator or the electric motor EM, the switching element 5 is in an open state, and in the case when the accumulator or the electric motor EM is to be used as a power supply, the switching element is in a closed state to provide the power flow. The same principle is applied to all components for which a failure or collapse of the power supply is detected.

In the case when the electric motor EM acts as the power source, the power supply for the component(s) can be provided via one or more of the AC phases U, V, W of the electric motor EM. FIG. 2 shows the case in which power is supplied via a single phase, here the AC phase V being chosen as an example. For this purpose, a diode D1 is additionally provided as a rectifier between the switching element 5 and the chosen AC phase V of the electric motor EM. The diode D1 in this case is connected with its anode to the AC phase V and with its cathode to the switching element 5. The switching element 5 receives its signal to use the electric motor EM or the accumulator as an energy source simultaneously from the EC signal. Thus, the driver supply is supplied from the energy of the rotating motor and can supply the component(s) with power again.

For example, in the event of a defective power semiconductor 2, the remaining power semiconductors 1 can thus be returned to the conducting state by the driver 3 in order to support the defective topological switch.

If two or more phases U, V, W are used, an appropriate, e.g. 3-phase, diode rectifier can be used instead of a single D1 diode, which is matched to the driver requirements. The voltage divider R1, R2 is connected downstream of the diode D1 or a diode rectifier.

The power electronic circuit is part of an electronics module (power electronics module). An electronic module for the purposes of this present disclosure is used for operating an electric drive of a vehicle, in particular an electric vehicle and/or a hybrid vehicle, and/or electrified axles. The electronics module comprises a DC/AC inverter. It can additionally comprise an AC/DC rectifier, a DC/DC converter, a transformer and/or another electrical converter or a part of such a converter or be part thereof. In particular, the electronics module is used to supply current to an E-machine, for example an electric motor and/or a generator. A DC/AC inverter is preferably used to generate a multiphase alternating current from a direct current generated by a DC voltage of a power source, such as a battery.

LIST OF REFERENCE SIGNS

1 power semiconductor (transistor)
2 defective power semiconductor (transistor)
3 driver
4 load

5 switching element
10 monitoring device
100 topological switch
R_gate gate resistor
R1, R2 voltage divider
D1 diode
EM electric motor
U, V, W AC phases
U1 voltage
EC emergency signal

The invention claimed is:

1. A power supply system for a power electronic circuit of an at least partially electrically driven motor vehicle comprising an accumulator and an electric motor having at least one phase, the power supply system comprising:

a driver board having components arranged thereon configured to activate the power electronic circuit, wherein components of the driver board are supplied with a supply voltage;

at least one monitoring device configured to monitor the supply voltage; and a circuit assembly comprising a switching element arranged between the at least one phase of the electric motor and the driver board in such a way that said switching element is configured to provide a power supply from the electric motor for one or more components of the driver board, wherein in response to the monitoring device detecting a failure or a reduction in the supply voltage of one or more components of the driver board, the monitoring device is configured to transfer the switching element from an open state, in which it supplies no power from the electric motor for one or more components of the driver board, to a closed state, in which it supplies power from the electric motor for one or more components of the driver board, for which the supply voltage has failed or collapsed.

2. The power supply system as claimed in claim 1, wherein the monitoring device is configured to, in the event that it detects the failure or reduction in the supply voltage, output an emergency signal to the switching element, which is configured to immediately change its state.

3. The power supply system as claimed in claim 1, wherein the power electronic circuit comprises a topological switch having at least two power semiconductors connected in parallel with one another, and at least one driver supplied with a supply voltage, which is configured to activate the power semiconductors.

4. The power supply system as claimed in claim 1, wherein a voltage divider and at least one diode and the switching element are arranged between the electric motor and the driver.

5. The power supply system as claimed in claim 1, which is part of an electronics module of the motor vehicle.

6. A motor vehicle, comprising:

the power supply system as claimed in claim 1.

7. A method for providing a power supply for a power electronic circuit of an at least partially electrically driven motor vehicle comprising an accumulator, and an electric motor having at least one phase, the method comprising:

activating, by components arranged on a driver board, the power electronic circuit;

supplying specified components of the driver board with a supply voltage;

monitoring, by at least one monitoring device, the supply voltage;

detecting, by the monitoring device, a failure or a reduction in the supply voltage of one or more components of the driver board; and in response to detecting the failure or the reduction in the supply voltage, transferring, by the monitoring device, a switching element of a circuit assembly from an open state, in which it supplies no power from the electric motor for one or more components of the driver board, to a closed state, in which it supplies power from the electric motor for one or more components of the driver board for which the supply voltage has failed or collapsed, wherein the switching element of the circuit assembly is arranged between the at least one phase of the electric motor and the driver board in such a way that said switching element is configured to supply the power from the electric motor for the one or more components of the driver board.

8. The method as claimed in claim 7, comprising:

outputting, by the monitoring device, an emergency signal to the switching element in response to detecting the failure or reduction in the supply voltage; and immediately changing the state of the switching element responsively.

9. The method as claimed in claim 7, wherein the power electronic circuit comprises a topological switch having at least two power semiconductors connected in parallel with one another, and at least one driver supplied with a supply voltage, wherein the method comprises:

activating, by the at least one driver, the power semiconductors.

10. The method as claimed in claim 8, wherein a voltage divider and at least one diode and the switching element are arranged between the electric motor and the driver.

* * * * *